US012603434B2

(12) United States Patent
Wei et al.

(10) Patent No.: US 12,603,434 B2
(45) Date of Patent: Apr. 14, 2026

(54) DUAL BOARD PATCH ARRAY ANTENNA

(71) Applicant: UniTik Technology Co., Limited, Taipei City (TW)

(72) Inventors: Tzu-Chie Wei, Taipei City (TW); Kai-Yuan Cheng, Taipei City (TW)

(73) Assignee: UniTik Technology Co., Limited, Taipei City (TW)

( * ) Notice: Subject to any disclaimer, the term of this patent is extended or adjusted under 35 U.S.C. 154(b) by 270 days.

(21) Appl. No.: 18/588,228

(22) Filed: Feb. 27, 2024

(65) Prior Publication Data

US 2025/0149791 A1 May 8, 2025

(30) Foreign Application Priority Data

Nov. 8, 2023 (TW) ................................ 112143110

(51) Int. Cl.
*H01Q 21/28* (2006.01)
*H01Q 9/04* (2006.01)
*H01Q 25/00* (2006.01)

(52) U.S. Cl.
CPC ........... *H01Q 9/0414* (2013.01); *H01Q 21/28* (2013.01); *H01Q 25/001* (2013.01)

(58) Field of Classification Search
CPC .... H01Q 9/0414; H01Q 21/28; H01Q 25/001; H01Q 21/24; H01Q 21/065
See application file for complete search history.

(56) References Cited

U.S. PATENT DOCUMENTS

| | | | | |
|---|---|---|---|---|
| 2010/0052994 | A1* | 3/2010 | Llorens del Rio | H01Q 5/385 343/893 |
| 2016/0056544 | A1* | 2/2016 | Garcia | H01Q 1/38 343/725 |
| 2017/0033462 | A1* | 2/2017 | Clemente | H01Q 1/48 |
| 2019/0237861 | A1* | 8/2019 | Kim | H01Q 1/2283 |
| 2020/0212559 | A1* | 7/2020 | Chen | H01Q 21/065 |

* cited by examiner

*Primary Examiner* — Dameon E Levi
*Assistant Examiner* — Michael M Bouizza

(57) ABSTRACT

The present invention provides a dual board patch array antenna, comprising: a radio board; a first-layer antenna board and a second-layer antenna board; the ground plane of the radio board is in contact with the first radiation ground plane of the first-layer antenna board through a patch-type conductive pad to form an extended ground area of ground connection; the probes of the radio board pass through and contact the patch microwave transmission line of the first-layer antenna board to form an electrical connection; wherein the patch microwave transmission line is assigned to the antenna radiating element of the second-layer antenna board as a vertically polarized antenna and a horizontally polarized antenna; the antenna radiating element contacts the first radiation surface on the first-layer antenna board through the conductor pad on the first layer antenna board, so as to expand the radiation surface area of the dual board patch array antenna.

10 Claims, 17 Drawing Sheets

DUAL BOARD PATCH ARRAY ANTENNA

CROSS-REFERENCE TO RELATED APPLICATIONS

This application claims the priority of Taiwanese patent application No. 112143110, filed on Nov. 8, 2023, which is incorporated herewith by reference.

PRIOR ART

Most of the traditional array antenna structure adopt the same design feed network method, for example, the series feed source network method. The advantage of which is that it is easier to design and implement, but the disadvantage of which is the antenna isolation and poor antenna gain.

FIG. 15 is a schematic diagram illustrating the antenna gain of the prior art. Please refer to FIG. 15, In the prior art, within the available frequency band of 5150-5850 MHZ, this line segment is a single PCB board design used for traditional array antenna gain, and there are problems such as insufficient gain bandwidth and the conversion efficiency of directional gain (directivity) being too low, etc. Therefore, the curve of this line segment shows that the gain is significantly reduced from the frequency of 5700 MHZ to 5850 MHZ, which indicates the problem of insufficient gain bandwidth and conversion efficiency. In addition, in terms of overall antenna gain performance, the gain performance of the traditional array antenna in this line segment is also significantly poorer.

BACKGROUND OF THE INVENTION

The present invention is an antenna device, particularly a dual board patch array antenna including both horizontal polarization and vertical polarization.

SUMMARY OF THE INVENTION

The Problem to be Solved by the Invention

It can be seen from the above-mentioned prior art that there are problems in the structure and feed network design of the current traditional array antenna. Therefore, there is a need to provide an antenna device that can simultaneously achieve easy implementation and improve antenna isolation and antenna gain.

Technical Means to Solve the Problem

Provides is a dual board patch array antenna, comprising: a radio board including a ground plane, a plurality of feed sources, a plurality of probes and a plurality of patch-type conductive pads, the ground plane being provided on a side of the radio board, the feed sources being provided on another side of the radio board, the probes being provided on the ground plane and passing through the ground plane and the radio board, and being electrically connected to the feed sources, and the patch-type conductive pads being provided adjacent to locations of the probes; a first-layer antenna board including a first radiation ground plane, a first radiation surface and a plurality of conductor pads, the first-layer antenna board being provided on the radio board, the first radiation ground plane being provided on a side of the first-layer antenna board, the first radiation surface being provided on another side of the first-layer antenna board, the first radiation surface including a plurality of groups of patch microwave transmission lines, and the conductor pads being provided on the first radiation surface; and a second-layer antenna board including a second radiation surface, the second-layer antenna board being provided on the first-layer antenna board, the second radiation surface being provided on a side of the second-layer antenna board, and the second radiation surface including a plurality of antenna radiating elements, wherein the ground plane forms an extended ground area by forming a ground connection by contacting the patch-type conductive pads with the first radiation ground plane, and the probes pass through the first radiation ground plane and the first-layer the antenna board and contact the patch microwave transmission lines to form an electrical connection, and wherein the patch microwave transmission lines are assigned to the antenna radiating elements to serve as a vertically polarized antenna and a horizontally polarized antenna, and the antenna radiating elements contact the first radiation surface through the conductor pads to expand a radiation surface area of dual board patch array antenna.

Preferably, the patch microwave transmission lines include a series-connected microwave transmission line feed source and a parallel-connected microwave transmission line feed source, the series-connected microwave transmission line feed source corresponds to the horizontally polarized antenna, and the parallel-connected microwave transmission line feed source corresponds to the vertically polarized antenna.

Preferably, the first-layer antenna board further includes a plurality of solder resist layers, the solder resist layers are provided on the first radiation surface, and each of the solder resist layers is correspondingly provided around each of the conductor pads.

Preferably, the conductor pads are provided on the first radiation surface through surface mount technology.

Preferably, the dual board patch array antenna further includes a plurality of plastic screws, a plurality of inner plastic through columns and a plurality of plastic nuts, the inner plastic through columns are provided between the first-layer antenna board and the second-layer antenna board, the plastic nuts are provided on another side of the second-layer antenna board, the plastic screws are disposed on the side of the first-layer antenna board, and the plastic screws pass through the first-layer antenna board, the inner plastic through columns, and the second-layer antenna board, and are locked with the plastic nuts, so as to fix the second-layer antenna board onto the first-layer antenna board.

Preferably, the dual board patch array antenna further includes a plurality of screws, a plurality of outer plastic through columns, a plurality of first nuts, a plurality of washers and a plurality of second nuts, the outer plastic through columns are provided at four corners between the first-layer antenna board and the second-layer antenna board, the first nuts are provided between the first-layer antenna board and the radio board, the washers and the second nuts are provided on the other side of the radio board, the screws are provided on the other side of the second-layer antenna board, and the screws pass through the second-layer antenna board, the outer plastic through columns, the first-layer antenna board, the first nuts, the radio board, and the washers, and are locked with the second nuts, so as to fix together the second-layer antenna board, the first-layer antenna board, and the radio board.

Preferably, the heights of the inner plastic through columns and the outer plastic through columns are identical to the heights of the conductor pads.

Preferably, the dual board patch array antenna further includes a signal switching pin and a radio frequency connection terminal, the signal switching pin and the radio frequency connection terminal are provided on the other side of the radio board and adjacent to one of the feed sources, a first terminal of the signal switching pin is electrically connected to one of the feed sources, a second terminal of the signal switching pin is electrically connected to one of the probes, and a third terminal of the signal switching pin is electrically connected to the radio frequency connection terminal.

Preferably, the dual board patch array antenna further includes an external dipole antenna, the external dipole antenna is disposed on the other side of the radio board adjacent to one of the feed sources, and the external dipole antenna is electrically connected to the radio frequency connection terminal.

Preferably, the isolation between the horizontally polarized antenna and the vertically polarized antenna is more than-30 dB in the frequency range of 4.5 GHZ to 6.4 GHZ, and the isolation in the frequency range of 5.15 GHz to 5.85 GHz is more than-40 dB.

Technical Effect

As can be seen from the above contents of the present invention, the present invention provides a dual board patch array antenna. The advantages and effects of the present invention are as follows: 1. the dual board patch array antenna has a certain strength of horizontally polarized antenna and vertically polarized antenna, so it can be used in the environments of remote areas or high-rise floors not blocked by obstructions, and the isolation between horizontally polarized antennas and vertically polarized antennas is quite high, so as to prevent the coupling between the two antennas affecting the overall performance of the antenna; 2. the present invention is a dual board patch type high-gain array antenna having the structure of dual board radiation antenna to effectively increases the radiation area to improve high-gain performance. The array antenna design combined with the patch microwave transmission line (microstrip) in-phase design can be configured to operate with horizontal and vertical polarizations; 3. the dual board patch array antenna of the present invention can be configured to operate in the WiFi_11AX frequency band, such as: 5.15 GHz to 5.85 GHz frequency band and/or 6 GHz to 6.9 GHZ and/or 2.4 GHz to 2.48 GHz frequency band.

DETAILED DESCRIPTION OF THE INVENTION

The following is a more detailed description of the embodiments of the present invention with reference to drawings and component symbols, so that those skilled in the art can implement them after reading this specification.

Figure 1:
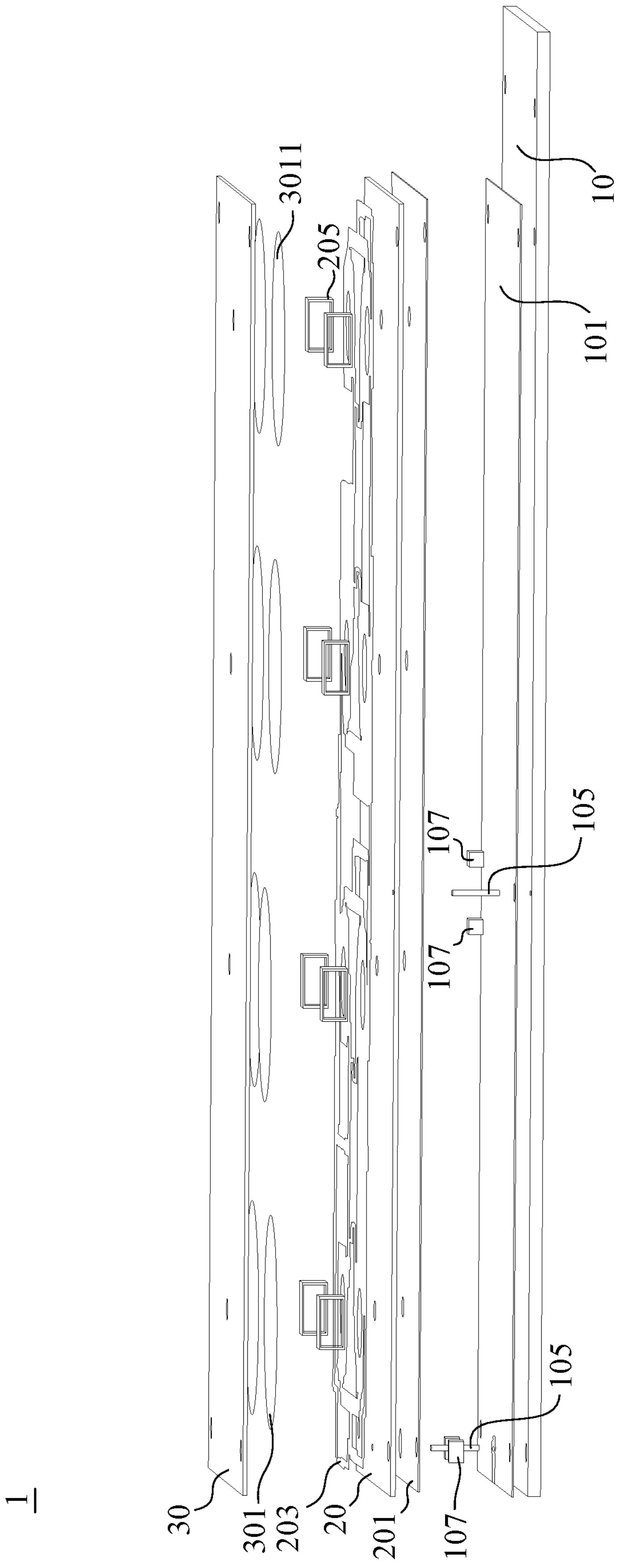
FIG. 1 is a schematic structural diagram of a dual board patch array antenna according to an embodiment of the present invention.
Figure 2A:
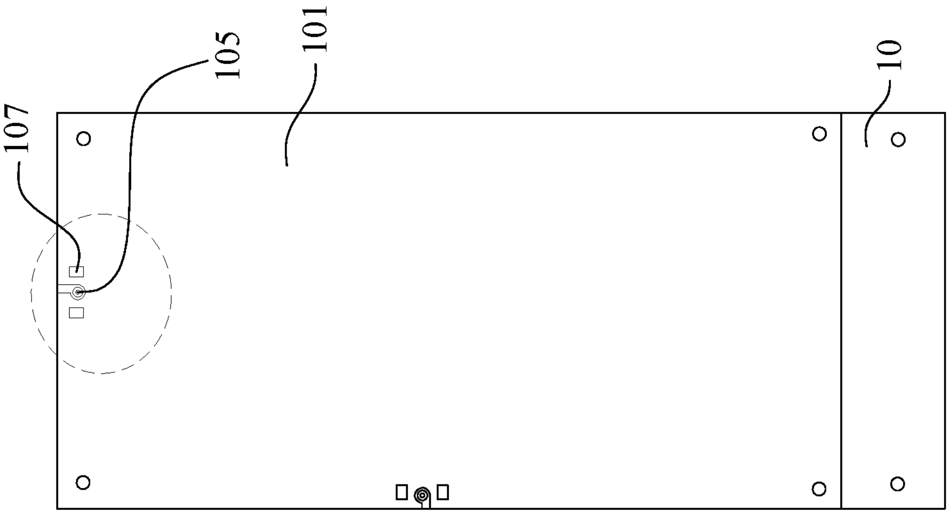
FIG. 2*a* is a schematic structural diagram of a side of a radio board according to an embodiment of the present invention.
Figure 2B:
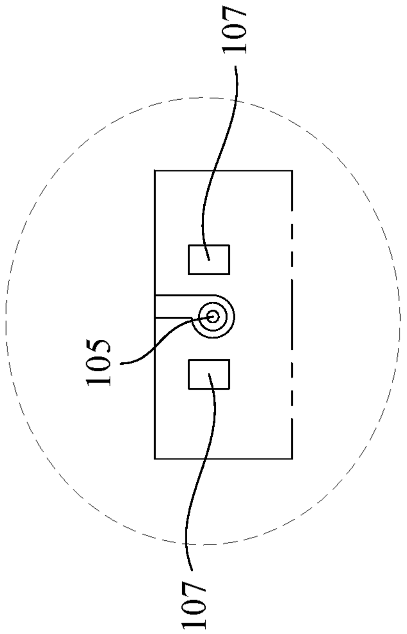
FIG. 2*b* is a schematic diagram of a partially enlarged structure of FIG. 2*a*.
Figure 3B:
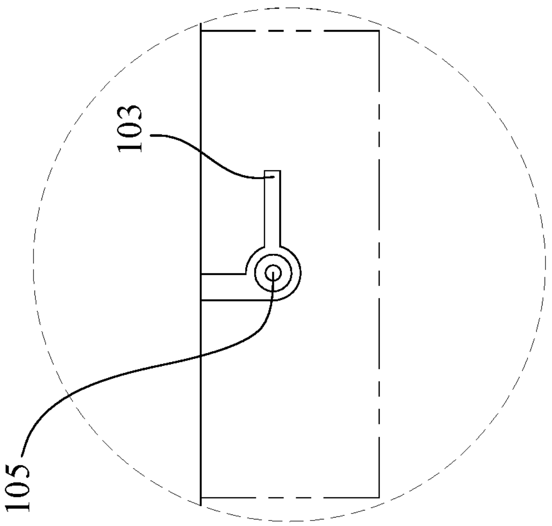
FIG. 3*b* is a schematic diagram of a partially enlarged structure of FIG. 3*a*.
Figure 3A:
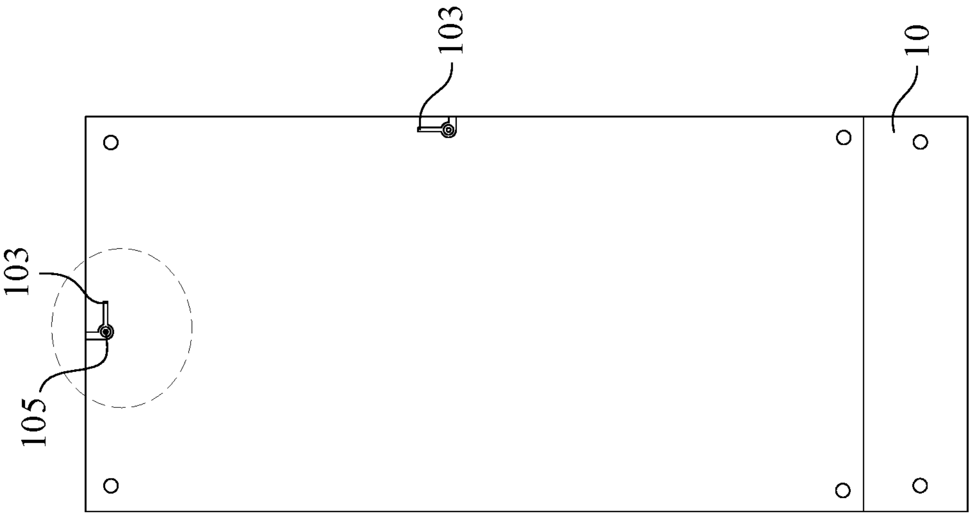
FIG. 3*a* is a schematic structural diagram of another side of the radio board according to an embodiment of the present invention.
Figure 4:
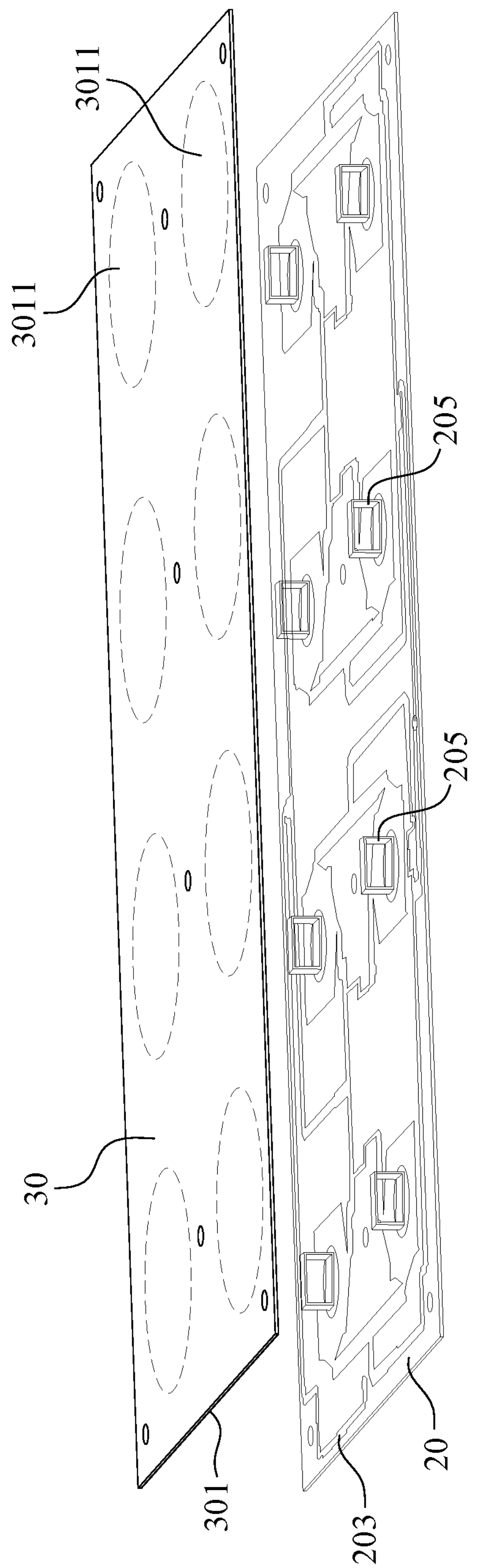
FIG. 4 is a schematic structural diagram of a first-layer antenna board and a second layer antenna board according to an embodiment of the present invention.

FIG. 1 is a schematic diagram illustrating the structure of a dual board patch array antenna according to an embodiment of the present invention; FIG. 2*a* is a schematic diagram illustrating the structure of a side of a radio board according to an embodiment of the present invention; FIG. 2*b* is a schematic diagram illustrating a partially enlarged structure of FIG. 2*a*; FIG. 3*a* is a schematic diagram to illustrate the structure of the other side of the radio board according to an embodiment of the present invention; FIG. 3*b* is a schematic diagram illustrating a partially enlarged structure of FIG. 3*a*; FIG. 4 is a schematic diagram illustrating the structure of a first-layer antenna board and a second-layer antenna board according to an embodiment of the present invention. Please refer to FIGS. 1 to 4. In an embodiment of the present invention, a dual board patch array antenna 1 is provided. The dual board patch array antenna 1 includes a radio board 10, a first-layer antenna board 20 and a second-layer antenna board 30. The radio board 10 includes a ground plane 101, a plurality of feed sources 103, a plurality of probes 105 and a plurality of patch-type conductive pads 107. The ground plane 101 is provided on a side of the radio board 10, and the feed sources 103 are provided on another side of the radio board 10, the probes 105 are disposed on the ground plane 101, and, as can be seen from FIGS. 2*a* to 3*b*, the probes 105 pass through the ground plane 101 and the radio board 10, and are electrically connected to the feed sources 103, and the patch-type conductive pads 107 are disposed adjacent to the position of probes 105. Wherein, the probes 105 are made of conductive material.

The first-layer antenna board 20 includes a first radiation ground plane 201, a first radiation surface 203 and a plurality of conductor pads 205. The first-layer antenna board 20 is disposed on the radio board 10. The first radiation ground plane 201 is provided on a side of the first-layer antenna board 20, the first radiation surface 203 is provided on another side of the first-layer antenna board 20, and the first radiation surface 203 includes a plurality of groups of patch microwave transmission lines 2031 (shown in FIG. 9), the conductor pads 205 are disposed on the first radiation surface 203. The second-layer antenna board 30 includes a second radiation surface 301. The second-layer antenna board 30 is disposed on the first-layer antenna board 20. The second radiation surface 301 is disposed on a side of the second-layer antenna board 30, and the radiation surface 301 includes a plurality of antenna radiating elements 3011. In addition, in one embodiment of the present invention, the shape of the antenna radiating element 3011 is circular, but it should be understood that the design of the antenna radiating element 3011 is not limited to any radiation surface shape, as long as it can achieve the function of increasing the effective radiation surface area.

Further, the ground plane 101 is in contact with the first radiation ground plane 201 through the patch-type conductive pads 107 to form an extended ground area of ground connection, and achieves the shortest return path effect of stabilizing the signal electromagnetic field. The probes 105 forms an electrical connection by passing through the first radiation ground plane 201 and the first-layer antenna board 20 and contacting the patch microwave transmission lines 2031. Specifically, the probes 105 contact a series-connected microwave transmission line feed source 2071 (shown in FIG. 9) and a parallel-connected microwave transmission line feed source 2073 (shown in FIG. 9). Furthermore, in an embodiment of the present invention, the patch microwave transmission lines 2031 (shown in FIG. 9) on the first radiation surface 203 allocates to the antenna radiating elements 3011 to serve as a vertically polarized antenna and a horizontally polarized antenna, and the antenna radiating elements 3011 contact the first radiation surface 203 through the conductor pads 205 to expand the radiation surface area of the dual board patch array antenna 1. In other words, the dual board patch array antenna 1 of the present invention can achieve the design of a horizontally polarized antenna and a vertically polarized antenna at the same time, allowing the antenna to operate at a wider frequency.

Figure 5A:
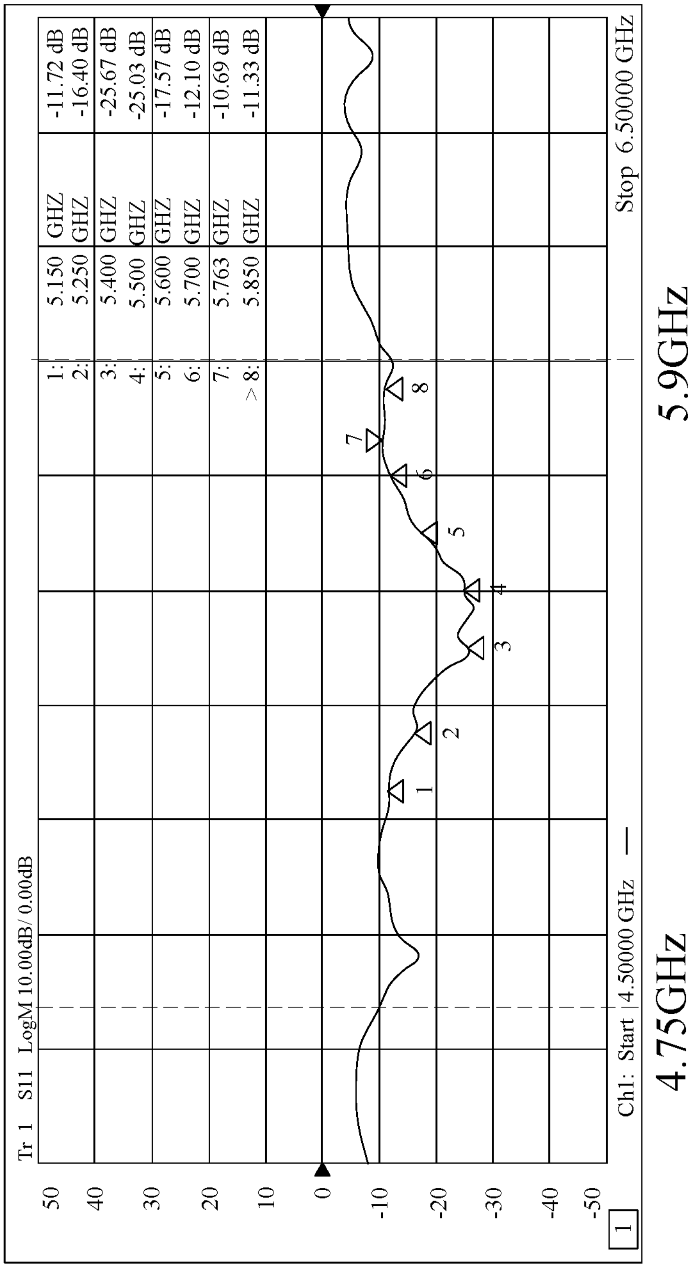
FIG. 5*a* is a schematic diagram of return loss of a horizontally polarized antenna according to an embodiment of the present invention.
Figure 5B:
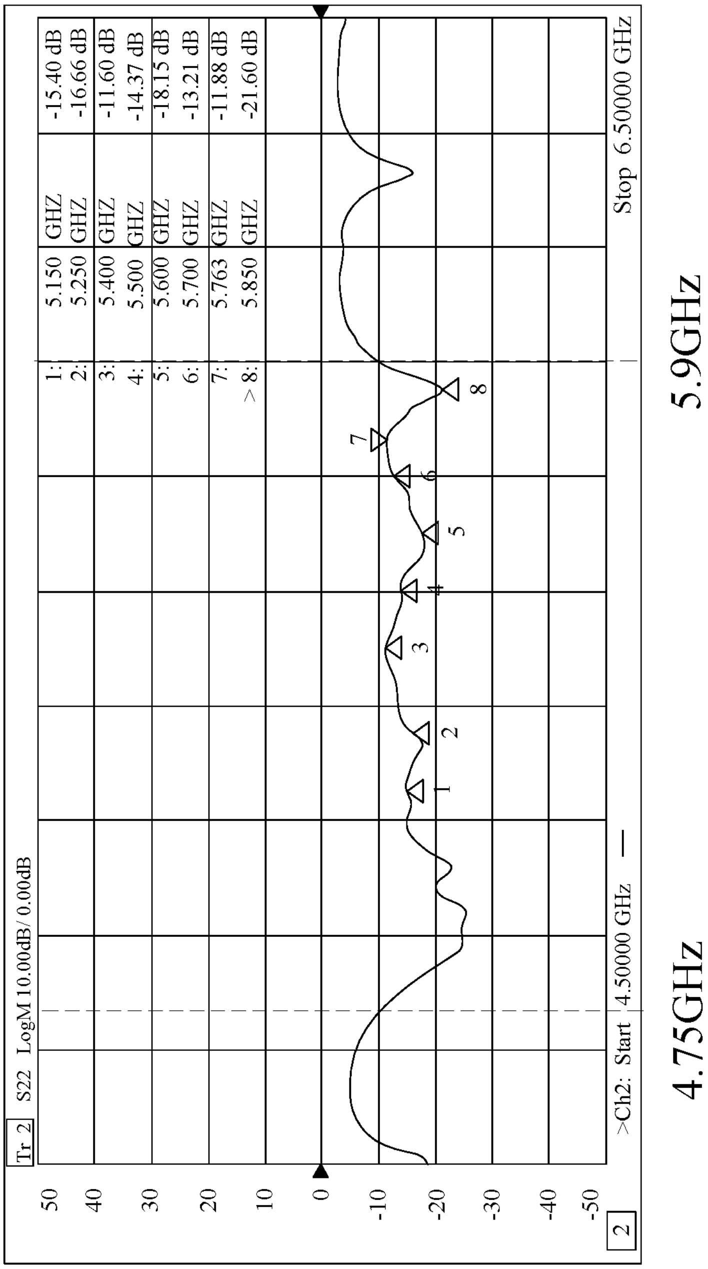
FIG. 5*b* is a schematic diagram of return loss of a vertically polarized antenna according to an embodiment of the present invention.
Figure 6A:
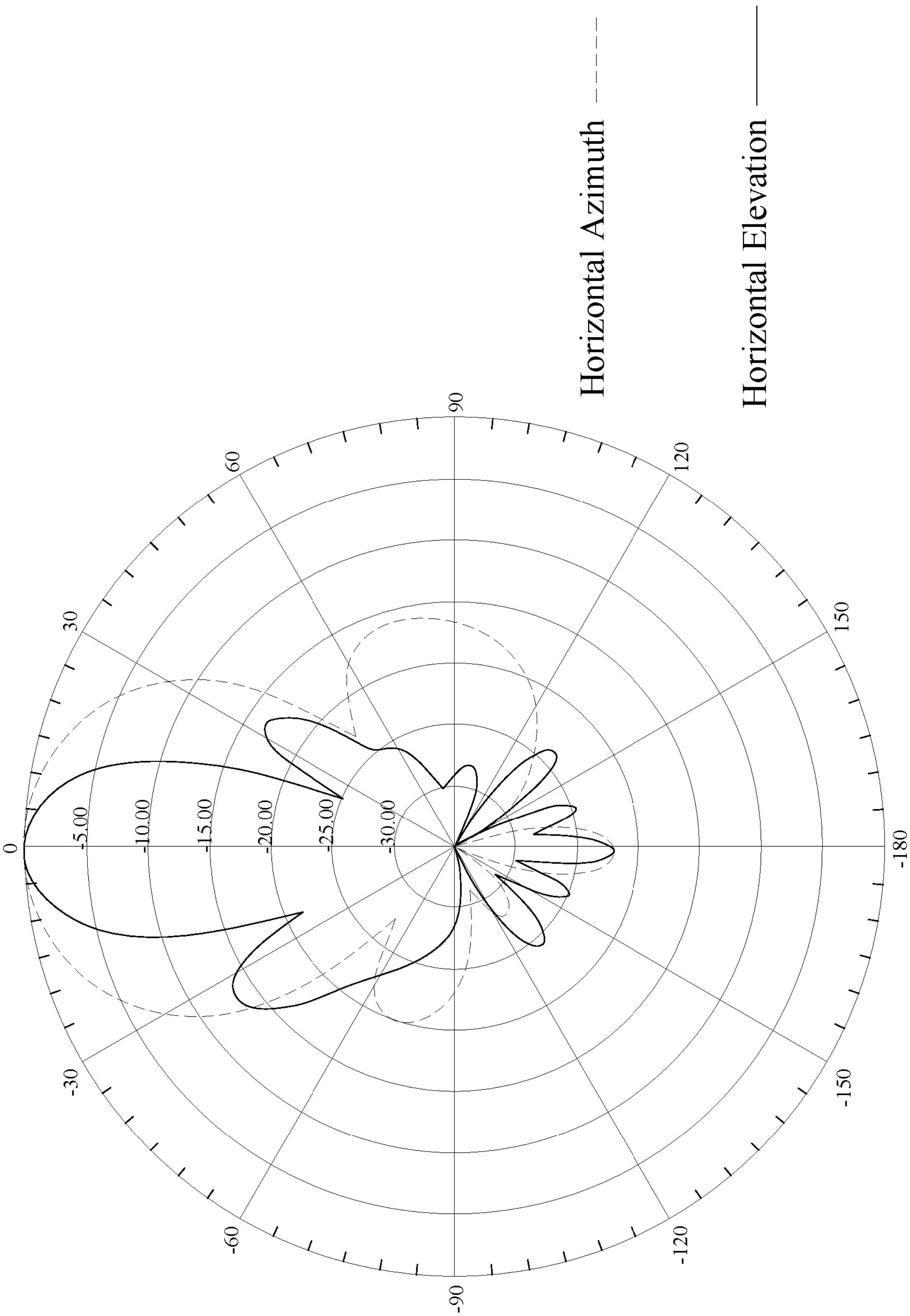
FIG. 6*a* is a schematic diagram of radiation field pattern of the horizontally polarized antenna according to an embodiment of the present invention.
Figure 6B:
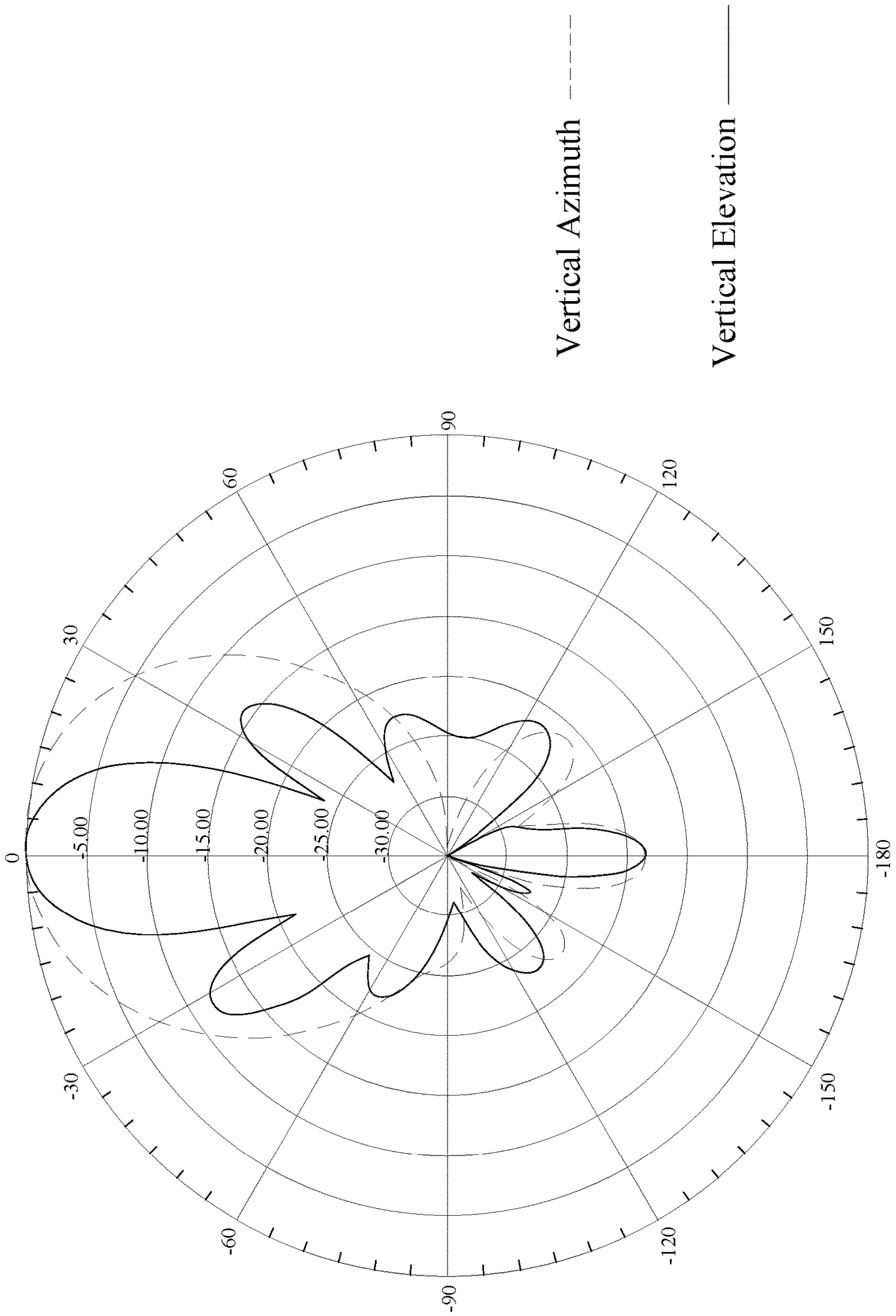
FIG. 6*b* is a schematic diagram of radiation field pattern of the vertically polarized antenna according to an embodiment of the present invention.

FIG. 5*a* is a schematic diagram illustrating the return loss of a horizontally polarized antenna according to an embodiment of the present invention; FIG. 5*b* is a schematic diagram illustrating the return loss of a vertically polarized antenna according to an embodiment of the present invention; FIG. 6*a* is a schematic diagram illustrating the radiation field pattern of a horizontally polarized antenna according to an embodiment of the present invention; FIG. 6*b* is a schematic diagram illustrating the radiation field pattern of a vertically polarized antenna according to an embodiment of the present invention. Please refer to FIGS. 1 and 4-6*b*. In one embodiment of the present invention, the dual board patch array antenna 1 includes eight groups of closely stacked array antenna transmitting elements. Specifically, eight antenna radiating elements 3011 contact the first radiation surface 203 through the eight conductor pads 205, and the eight antenna radiating elements 3011 are distributed as vertically polarized antennas and horizontally polarized antennas. It can be seen from the return loss and radiation field pattern of the horizontally polarized antenna in FIG. 5*a* and FIG. 6*a* that, in the available frequency range of 4.75 GHz to 5.9 GHZ, the horizontally polarized antenna can achieve a wide frequency band of more than 1 GHZ, and both the horizontal azimuth and the horizontal elevation can achieve a certain intensity. Further, from the return loss and radiation field pattern of the vertically polarized antenna in FIG. 5*b* and FIG. 6*b*, it can be seen that in the available frequency range of 4.75 GHz to 5.9 GHZ, the vertically polarized antenna can also achieve a wide frequency band of more than 1 GHZ, and both the vertical azimuth and the vertical elevation can also achieve a certain intensity.

Figure 7:
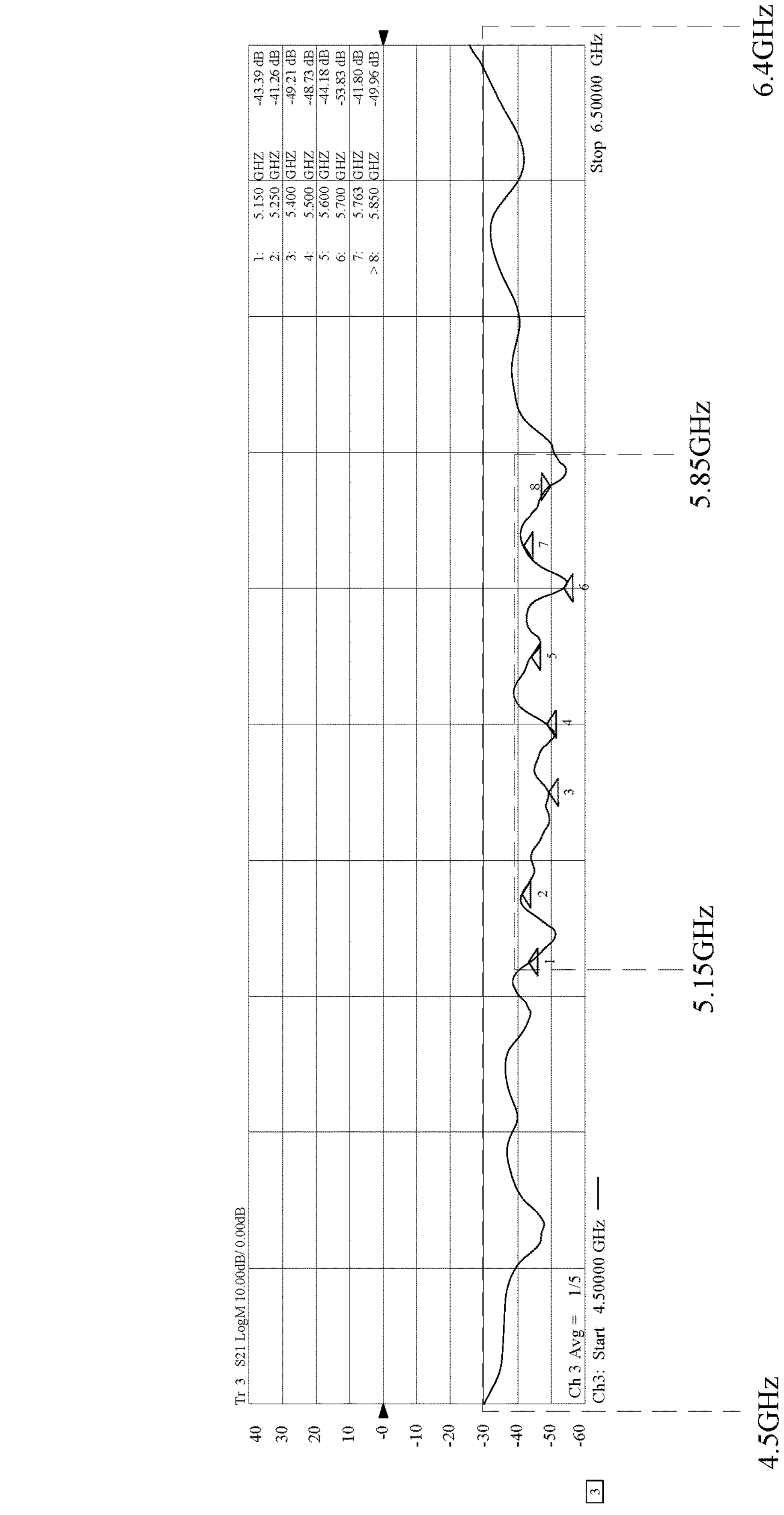
FIG. 7 is a schematic diagram of isolation between the horizontally polarized antenna and the vertically polarized antenna according to an embodiment of the present invention.

FIG. 7 is a schematic diagram illustrating the isolation between a horizontally polarized antenna and a vertically polarized antenna according to an embodiment of the present invention. Please refer to FIG. 1 and FIG. 7. The isolation of the horizontally polarized antenna and the vertically polarized antenna composed of eight antenna radiating elements 3011 in the frequency range 4.5 GHz to 6.4 GHz is more than-30 dB, and in the WIFI frequency range of 5.15 GHz to 5.85 GHZ, the isolation can be more than-40 dB. In other words, the horizontally polarized antenna and the vertically polarized antenna of the dual board patch array antenna 1 of the present invention do not interfere with each other, and can respectively achieve certain intensity and reduce return loss.

Figure 8:
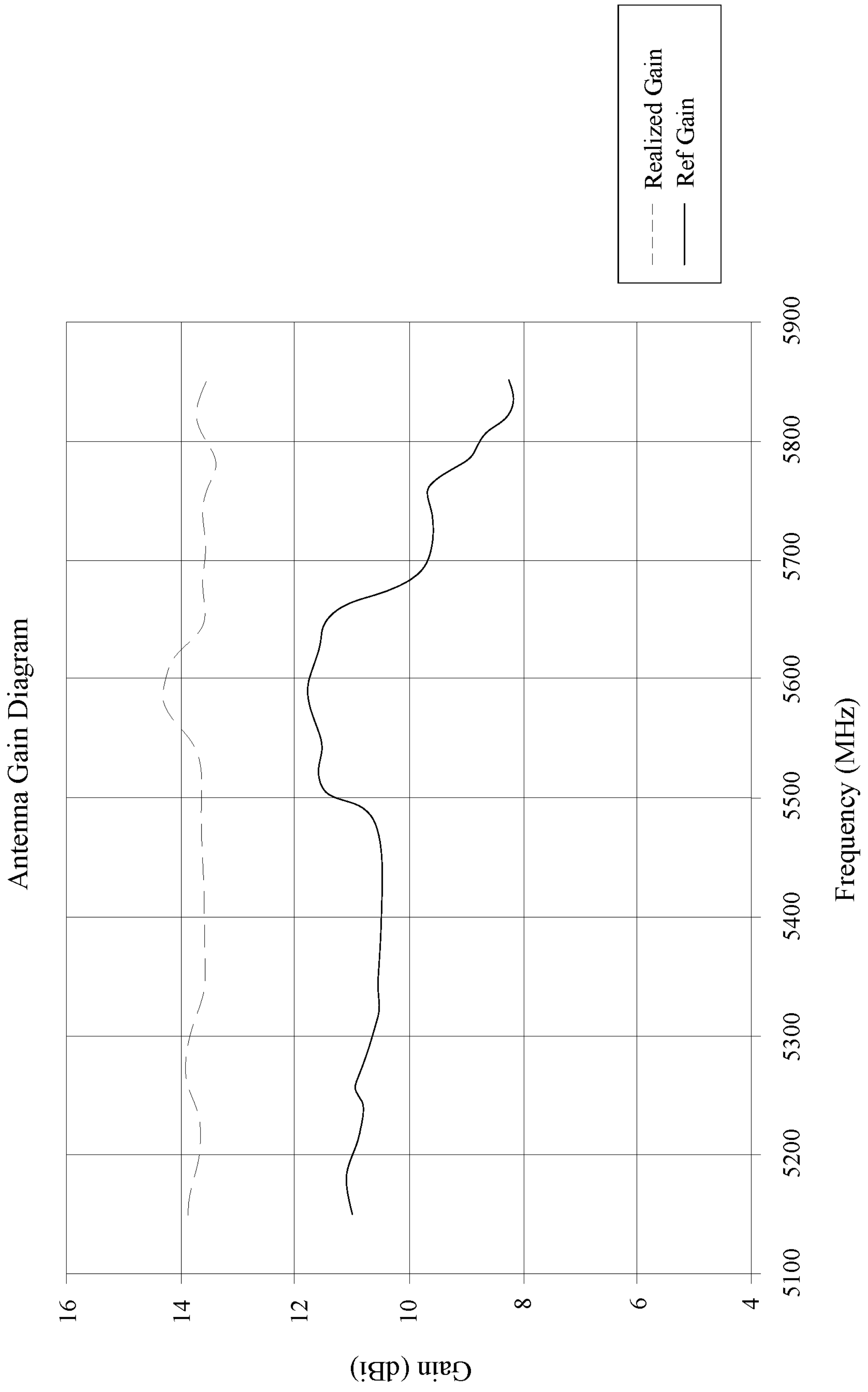
FIG. 8 is a schematic diagram of antenna gain comparison according to an embodiment of the present invention.

FIG. 8 is a schematic diagram illustrating antenna gain comparison according to an embodiment of the present invention. Please refer to FIGS. 1 and 8. In FIG. 8, the upper dotted line segment represents the antenna gain of the dual board patch array antenna 1 of the present invention, and the lower solid line segment represents the antenna gain of the traditional array antenna mentioned in the previous prior art section. It can be seen from the comparison of the two curves that the gain of the dual board patch array antenna 1 of the present invention obviously maintains a certain intensity from the frequency of 5700 MHz to 5850 MHz without declining, indicating the gain bandwidth range of the present invention being wider. In addition, the overall antenna gain is also significantly better in comparison.

Figure 9:
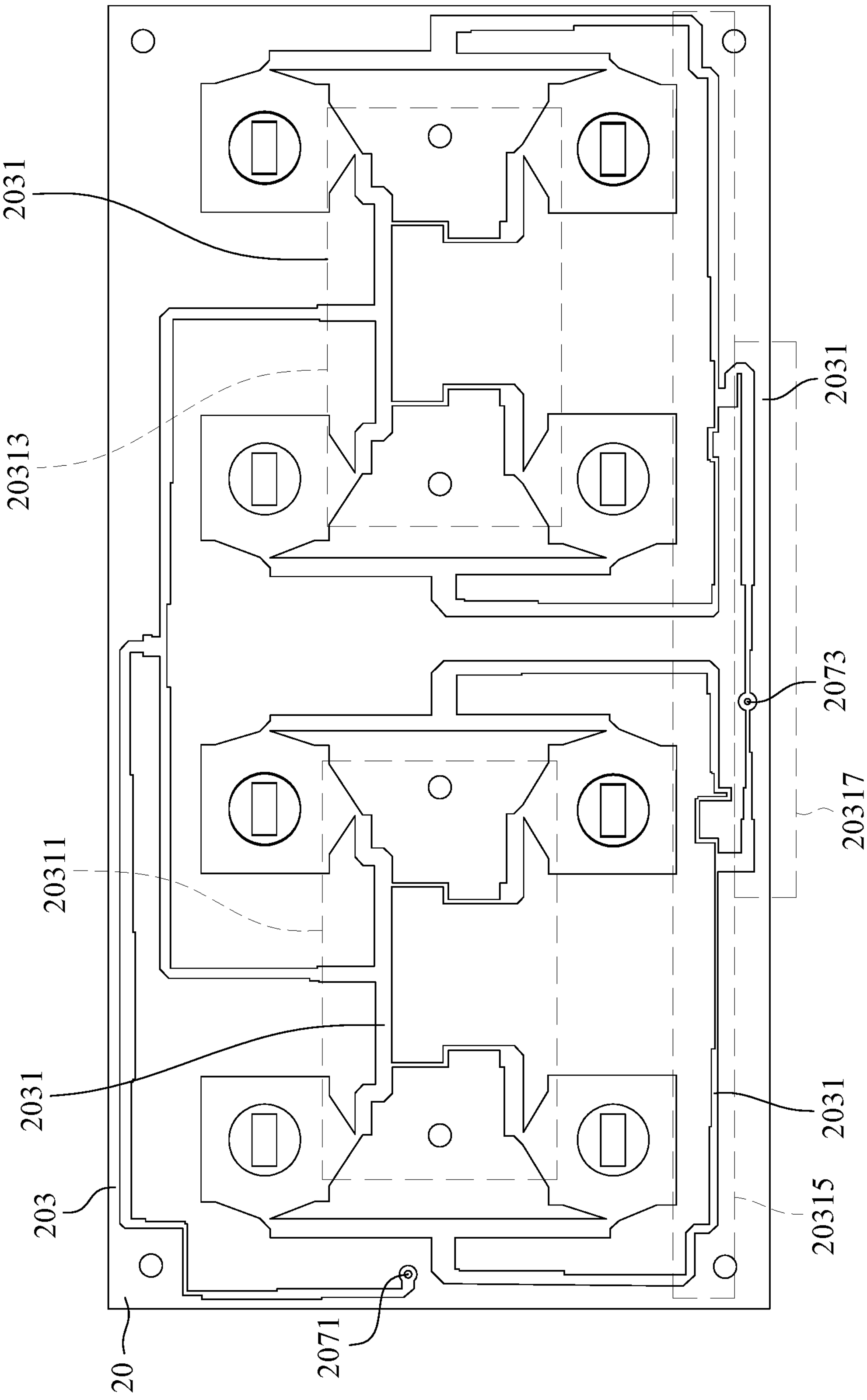
FIG. 9 is a schematic structural diagram of the second-layer antenna board according to an embodiment of the present invention.

FIG. 9 is a schematic diagram illustrating the structure of the second-layer antenna board according to an embodiment of the present invention. Please refer to FIG. 1 and FIG. 9. In one embodiment of the present invention, the patch microwave transmission lines 2031 include the series-connected microwave transmission line feed source 2071 and the parallel-connected microwave transmission line feed source 2073. The series-connected microwave transmission line feed source 2071 corresponds to a horizontally polarized antenna, and the parallel-connected microwave transmission line feed source 2073 corresponds to a vertically polarized antenna. In detail, the feed network (source) of the present invention adopts two different types of designs, which mainly improves the isolation between antennas, so that the isolation in the operating frequency range of 5.15 GHz to 5.85 GHz is-40 dB or less.

In the network of the series-connected microwave transmission line feed source 2071, a microwave transmission line 20311 and a microwave transmission line 20313 is used to match the impedance and perform an inverse 180-degree phase shift, respectively, so as to control the phase difference (in-phase) between the output terminals of each feed network, and finally match its microstrip gradient structure to the terminal load to guide the electromagnetic waves radiated by the antenna to a single polarization (i.e. horizontal polarization). On the other hand, in the network of the parallel-connected microwave transmission line feed source 2073, a microwave transmission line 20315 and a microwave transmission line 20317 is used as an one divided into two network, and then the microwave transmission line 20315 and the microwave transmission line 20317 is used for impedance matching and performing a secondary inverse 180-degree phase shift, so as to control the phase difference (in-phase) between the output terminals of each feed network, and finally match its microstrip gradient structure to the terminal load to guide the electromagnetic waves radiated by the antenna to a single polarization (i.e., vertical polarization). Therefore, the first-layer antenna board 20 of the dual board patch array antenna 1 of the present invention includes two different feed network designs, and the isolation between the two antennas is very good.

Figure 10:
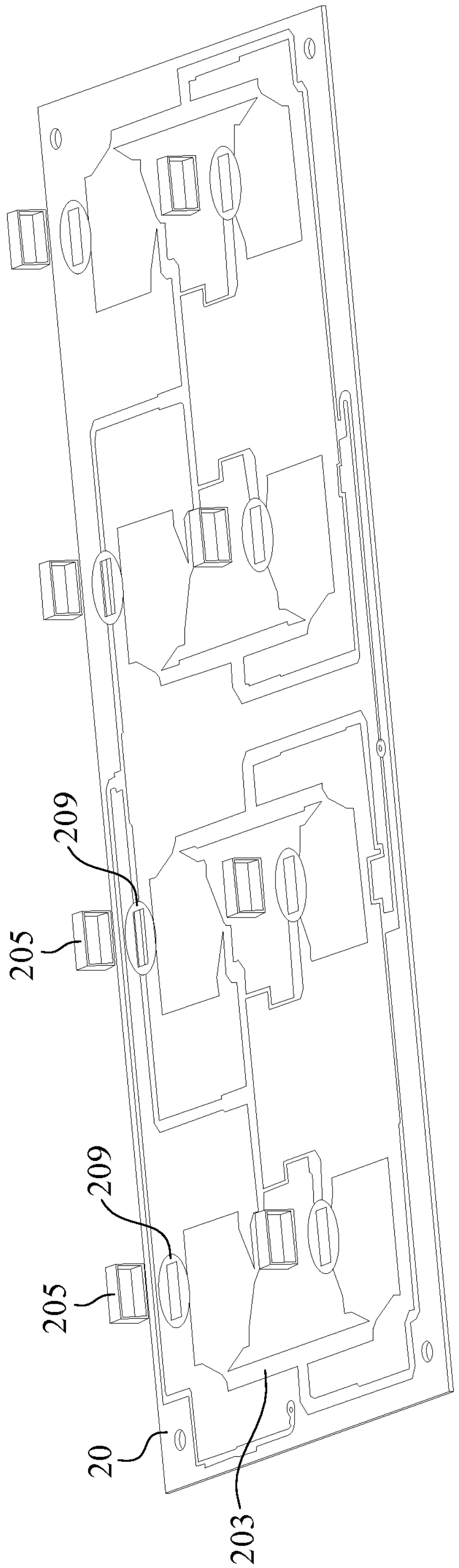
FIG. 10 is a schematic structural diagram of the second-layer antenna board according to another embodiment of the present invention.

FIG. 10 is a schematic diagram illustrating the structure of the second-layer antenna board according to another embodiment of the present invention. Please refer to FIG. 10. In an embodiment of the present invention, the first-layer antenna board 20 further includes a plurality of solder resist layers 209. The solder resist layers 209 are disposed on the first radiation surface 203, and each solder resist layer 209 is disposed correspondingly around each conductor pad 205. In detail, all conductor pads 205 are disposed on the first radiation surface 203 through surface-mount technology (SMT). In order to avoid tin overflow during the production process, the solder resist layers 209 (or isolation layer) is provided around the conductor pads 205 to control the amount of tin. In addition, in another embodiment of the present invention, the shape of the solder resist layer 209 is circular, but it should be understood that the solder resist layer 209 is not limited to any shape, as long as the purpose of blocking the overflow of the tin and controlling the area region of tin are achieved. Furthermore, the material of the conductor pad 205 must be a conductor, but the size of conductivity and shape of the conductor is not limited. It can also be designed in the form of elastic pieces or thimbles.

Figure 11:
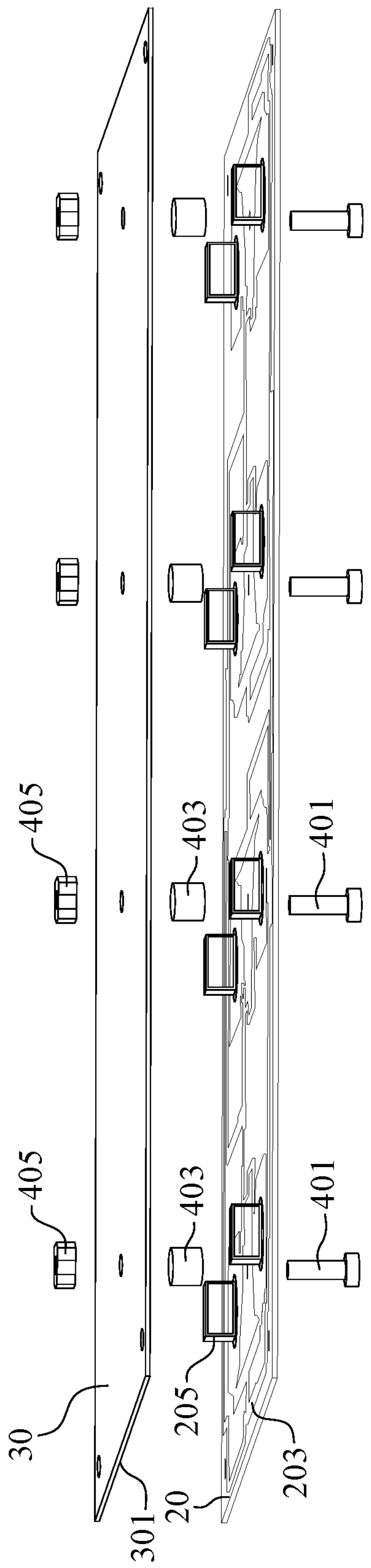
FIG. 11 is a schematic diagram of a combined structure of the first-layer antenna board and the second-layer antenna board according to another embodiment of the present invention.

FIG. 11 is a schematic diagram illustrating the combined structure of the first-layer antenna board and the second-layer antenna board according to another embodiment of the present invention. Please refer to FIGS. 1 and 11. In yet another embodiment of the present invention, the dual board patch array antenna 1 further includes a plurality of plastic screws 401, a plurality of inner plastic through columns 403 and a plurality of plastic nuts 405. The inner plastic through columns 403 are provided between the first-layer antenna board 20 and the second-layer antenna board 30, the plastic nuts 405 are provided on another side of the second-layer antenna board 30, and the plastic screws 401 are provided on a side of the first-layer antenna board 20, and the plastic screws 401 pass through the first-layer antenna board 20, the inner plastic through columns 403, the second-layer antenna board 30 and lock with the plastic nuts 405, so as to fix the second-layer antenna board 30 on the first-layer antenna board 20.

Specifically, the first-layer antenna board 20 and the second-layer antenna board 30 have corresponding hole positions. In another embodiment of the present invention, the hole positions are configured between the first-layer antenna board 20 and the second-layer antenna board 30. The plastic screws 401 are firstly inserted under the second-layer antenna board 30, then, the inner plastic through columns 403 between the first-layer antenna board 20 and the second-layer antenna 30 support and secure the spacing between the first-layer antenna board 20 and the second-layer antenna 30 with its height. Finally, the plastic nuts 405 are screwed for fixation and the assembling is complete. Further, the height of the inner plastic through columns 403 is used to support and fix the distance between the two antenna boards to ensure the flatness between the two boards and the contact area between the conductor pad 205 and the second radiation surface 301. It should be understood that the location, diameter, and quantity of the holes on the first-layer antenna board 20 and the second-layer antenna board 30 is not limited, as long as the first-layer antenna board 20 and the second-layer antenna board 30 can be locked. Further, the height of the inner plastic through column 403 is the same as the height of the conductor pads 205, so that the flatness between the two boards can be achieved and the electrical connection between the two boards is not affected.

Figure 12:
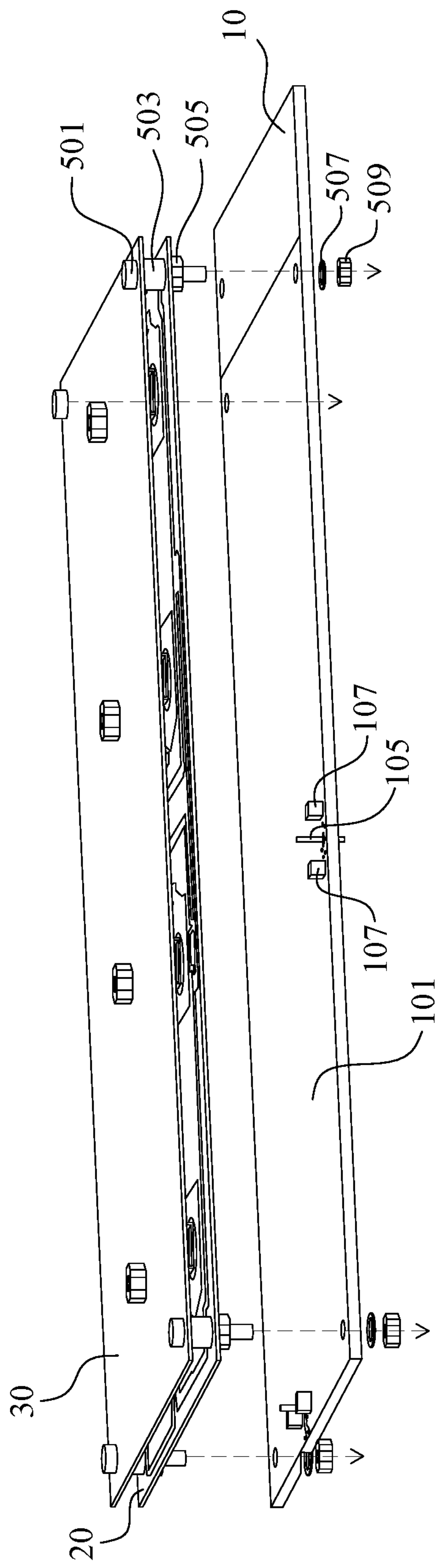
FIG. 12 is a schematic diagram of a combined structure of the first-layer antenna board, the second-layer antenna board, and the radio board according to yet another embodiment of the present invention.
Figure 13:
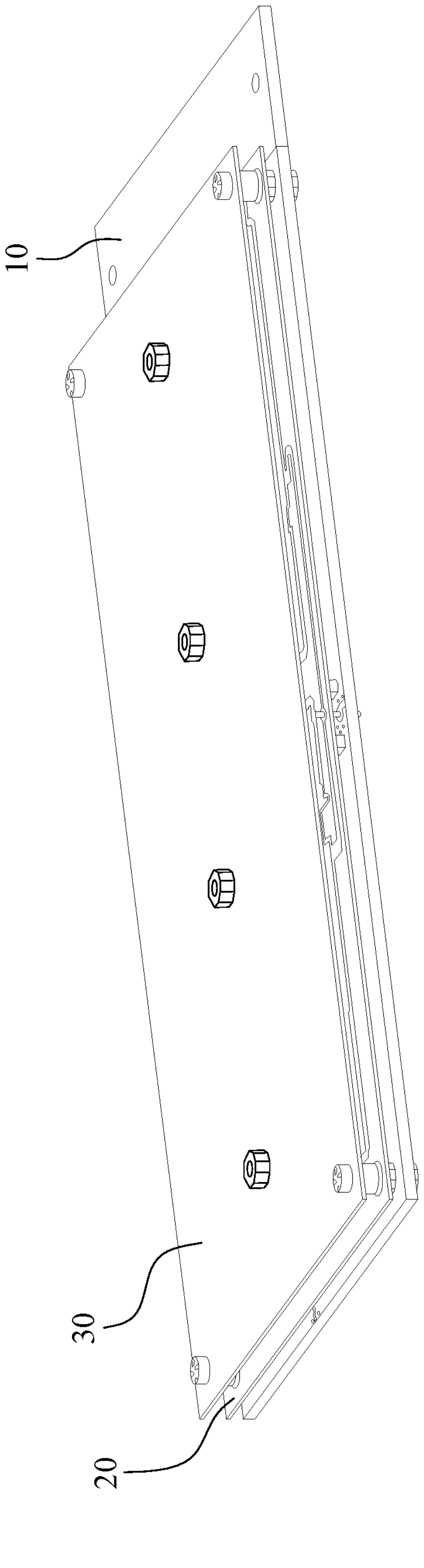
FIG. 13 is a schematic diagram of an overall assembly structure of a dual board patch array antenna according to yet another embodiment of the present invention.

FIG. 12 is a schematic diagram illustrating the combined structure of the first-layer antenna board, the second-layer antenna board and the radio board according to yet another embodiment of the present invention; FIG. 13 is a schematic diagram illustrating the overall combined structure of the dual board patch array antenna according to yet another embodiment of the present invention. Please refer to FIG. 1 and FIGS. 11-13. In yet another embodiment of the present invention, further includes a plurality of screws 501, a plurality of outer plastic through columns 503, a plurality of first nuts 505, a plurality of washers 507 and a plurality of second nuts 509. The outer plastic through columns 503 are provided at the four corners between the first-layer antenna board 20 and the second-layer antenna board 30, the first nuts 505 are provided between the first-layer antenna board 20 and the radio board 10, the washers 507 and the second nuts 509 are provided on the other side of the radio board 10, the screws 501 are provided on the other side of the second-layer antenna board 30, and the screws 501 pass through the second-layer antenna board 30, the outer plastic through columns 503, the first-layer antenna board 20, the first nuts 505, the radio board 10, and the washers 507 and are locked with the second nuts 509, so as to secure together the second-layer antenna board 30, the first-layer antenna board 20 and radio board 10. Wherein, the screws 501, the first nuts 505, the washers 507 and the second nuts 509 can be made of metal.

Specifically, the radio board 10, the first-layer antenna board 20, and the second-layer antenna board 30 all have corresponding hole positions. In yet another embodiment of the present invention, the hole positions are configured on four corners of the radio board 10, the first-layer antenna board 20 and the second-layer antenna board 30. Firstly, the screws 501 are inserted from the top of the second-layer antenna board 30. Similarly, the outer plastic through columns 503 between the first-layer antenna board 20 and the second-layer antenna 30 support and secure the spacing between the first-layer antenna board 20 and the second-layer antenna 30 with its height. Then, the screws 501 are passed through the assembled first-layer antenna board 20 and second-layer antenna 30, then the radio board 10, and then screwed into the second nuts 509 for fixation. Finally, the probes 105 are welded on the first-layer antenna board 20, so as to complete the assembly of the dual board patch array antenna 1. Wherein, since the height of the inner plastic through column 403 and the outer plastic through column 503 is the same as the height of the conductor pads 205, after the first-layer antenna board 20 and the second-layer antenna board 30 are assembled, it is still possible to configure the outer plastic through column 503 at the four corners between the first-layer antenna board 20 and the second-layer antenna board 30.

Figure 14:
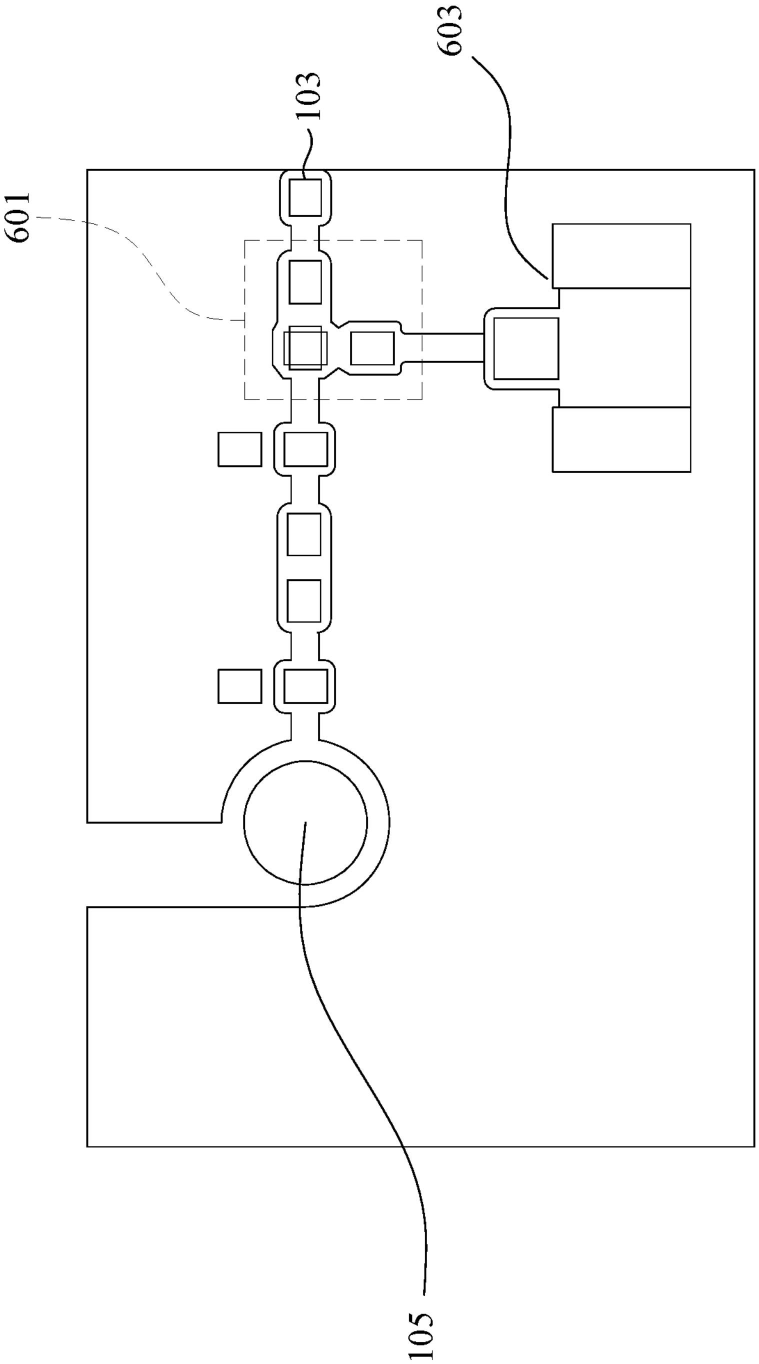
FIG. 14 is a schematic structural diagram of a feed source according to yet another embodiment of the present invention.
Figure 15:
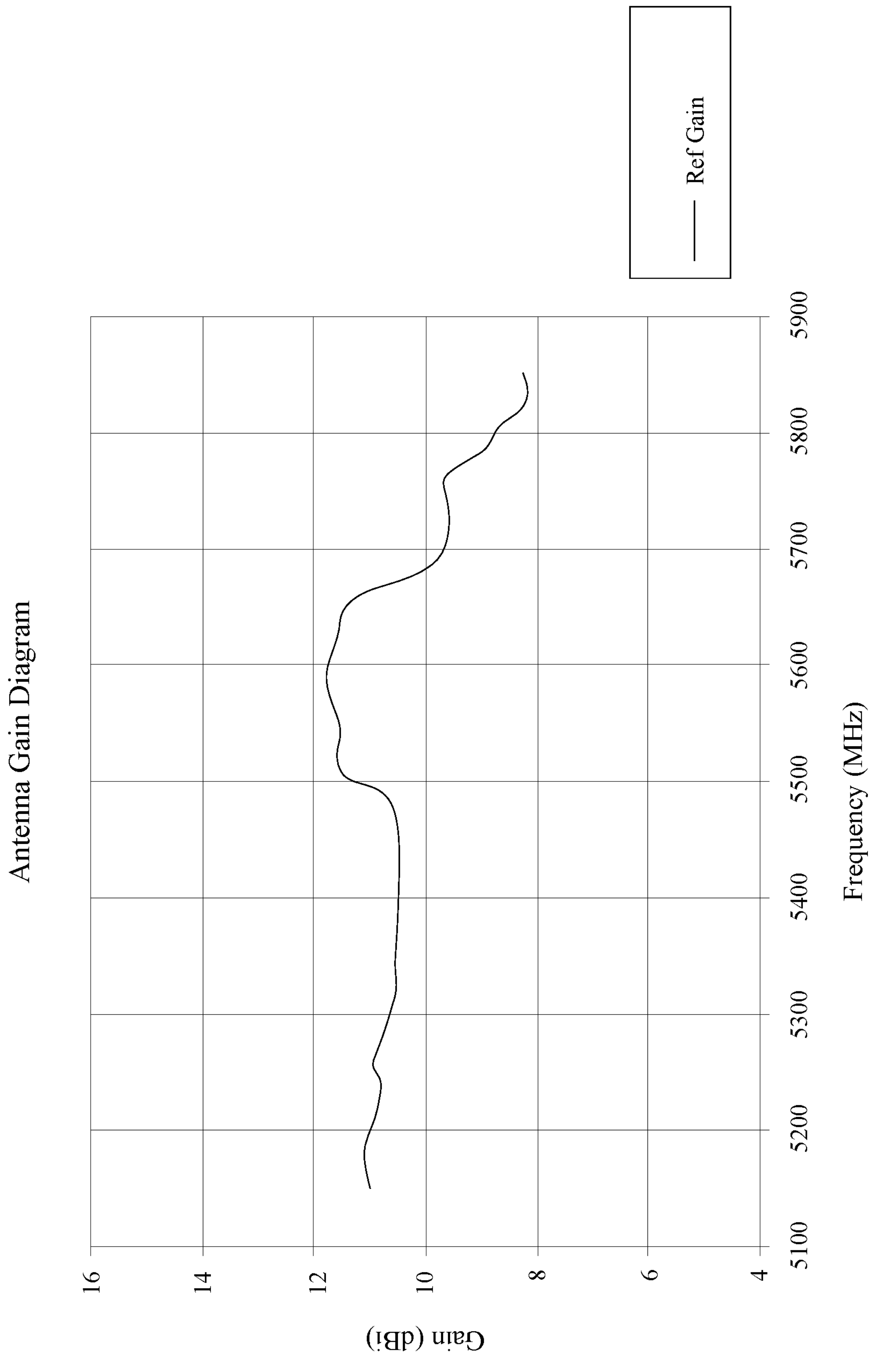
FIG. 15 is a schematic diagram illustrating the antenna gain of the prior art.

FIG. 14 is a schematic diagram illustrating the structure of a feed source according to yet another embodiment of the present invention. Please refer to FIGS. 1-3*b* and 14. In yet another embodiment of the present invention, the dual board patch array antenna 1 further includes a signal switching pin 601 and a radio frequency connection terminal 603. The signal switching pin 601 and radio frequency connection terminal 603 are provided on the other side of the radio board 10 and adjacent to one of the feed sources 103. A first terminal of the signal switching pin 601 is electrically connected to one of the feed sources 103, a second terminal of the signal switching pin 601 is electrically connected to one of the probes 105, and a third terminal of the signal switching pin 601 is electrically connected to the radio frequency connection terminal 603. Therefore, the dual board patch array antenna 1 of the present invention can increase the functions of the antenna by configuring the signal switching pin 601. For example, in yet another embodiment of the present invention, the dual board patch array antenna 1 may further include an external dipole antenna (not shown in the figures), and the external dipole antenna is disposed on the other side of the radio board 10 adjacent to one of the feed sources 103, and the external dipole antenna is electrically connected to the radio frequency connection terminal 603, so that the dual board patch array antenna 1 further includes the function of an external dipole antenna.

On the other hand, please refer to FIG. 2*b* again. In yet another embodiment of the present invention, in order to achieve optimal impedance matching, the clearance area of the probe 105 can be asymmetrically designed, thereby improving the impedance loss problem of discontinuity surface, so as to improve the transmission of maximum energy signal. In addition, the probe 105 and the surrounding patch-type conductive pads 107 on both sides can be equally spaced, and the effect is better if the spacing distance is within 3 mm. Furthermore, the dual board patch array antenna 1 of the present invention can also be applied to a multi-layer PCB structure, and the probe 105 is used to conduct signals.

As can be seen from the above contents of the present invention, the present invention provides a dual board patch array antenna. The advantages and effects of the present invention are as follows: 1. the dual board patch array antenna has a certain strength of horizontally polarized antenna and vertically polarized antenna, so it can be used in the environments of remote areas or high-rise floors not blocked by obstructions, and the isolation between horizontally polarized antennas and vertically polarized antennas is quite high; 2. the present invention is a dual board patch type high-gain array antenna having the structure of dual board radiation antenna to effectively increases the radiation area to improve high-gain performance. The array antenna design combined with the patch microwave transmission line (microstrip) in-phase design can be configured to operate with horizontal and vertical polarizations; 3. the dual board patch array antenna of the present invention can be configured to operate in the WiFi_11AX frequency band, such as: 5.15 GHz to 5.85 GHz frequency band and/or 6 GHz to 6.9 GHz and/or 2.4 GHz to 2.48 GHz frequency band; 4. the radiation body of the dual board patch array antenna uses patch-type pads as a conductor medium. The first-layer antenna board can be processed using surface-mount technology (SMT) to avoid solder overflow. Also, a solder resist layer (isolation) layer is also designed around the patch-type pads to control the amount of tin.

The invention claimed is:

1. A dual board patch array antenna, comprising:

a radio board including a ground plane, a plurality of feed sources, a plurality of probes and a plurality of patch-type conductive pads, the ground plane being provided on a side of the radio board, the feed sources being provided on another side of the radio board, the probes being provided on the ground plane and passing through the ground plane and the radio board, and being electrically connected to the feed sources, and the patch-type conductive pads being provided adjacent to locations of the probes;

a first-layer antenna board including a first radiation ground plane, a first radiation surface and a plurality of conductor pads, the first-layer antenna board being provided on the radio board, the first radiation ground plane being provided on a side of the first-layer antenna board, the first radiation surface being provided on another side of the first-layer antenna board, the first radiation surface including a plurality of groups of patch microwave transmission lines, and the conductor pads being provided on the first radiation surface; and a second-layer antenna board including a second radiation surface, the second-layer antenna board being provided on the first-layer antenna board, the second radiation surface being provided on a side of the second-layer antenna board, and the second radiation surface including a plurality of antenna radiating elements, wherein the ground plane forms an extended ground area by forming a ground connection by contacting the patch-type conductive pads with the first radiation ground plane, and the probes pass through the first radiation ground plane and the first-layer the antenna board and contact the patch microwave transmission lines to form an electrical connection, and wherein the patch microwave transmission lines are assigned to the antenna radiating elements to serve as a vertically polarized antenna and a horizontally polarized antenna, and the antenna radiating elements contact the first radiation surface through the conductor pads to expand a radiation surface area of the dual board patch array antenna.

2. The dual board patch array antenna according to claim 1, wherein the patch microwave transmission lines include a series-connected microwave transmission line feed source and a parallel-connected microwave transmission line feed source, the series-connected microwave transmission line feed source corresponds to the horizontally polarized antenna, and the parallel-connected microwave transmission line feed source corresponds to the vertically polarized antenna.

3. The dual board patch array antenna according to claim 1, wherein the first-layer antenna board further includes a plurality of solder resist layers, the solder resist layers are provided on the first radiation surface, and each of the solder resist layers is correspondingly provided around each of the conductor pads.

4. The dual board patch array antenna according to claim 3, wherein the conductor pads are provided on the first radiation surface through surface mount technology.

5. The dual board patch array antenna according to claim 1, further comprising a plurality of plastic screws, a plurality of inner plastic through columns and a plurality of plastic nuts, wherein the inner plastic through columns are provided between the first-layer antenna board and the second-layer antenna board, the plastic nuts are provided on another side of the second-layer antenna board, the plastic screws are disposed on the side of the first-layer antenna board, and the plastic screws pass through the first-layer antenna board, the inner plastic through columns, and the second-layer antenna board, and are locked with the plastic nuts, so as to fix the second-layer antenna board onto the first-layer antenna board.

6. The dual board patch array antenna according to claim 5, further comprising a plurality of screws, a plurality of outer plastic through columns, a plurality of first nuts, a plurality of washers and a plurality of second nuts, wherein the outer plastic through columns are provided at four corners between the first-layer antenna board and the second-layer antenna board, the first nuts are provided between the first-layer antenna board and the radio board, the washers and the second nuts are provided on the other side of the radio board, the screws are provided on the other side of the second-layer antenna board, and the screws pass through the second-layer antenna board, the outer plastic through columns, the first-layer antenna board, the first nuts, the radio board, and the washers, and are locked with the second nuts, so as to fix together the second-layer antenna board, the first-layer antenna board, and the radio board.

7. The dual board patch array antenna according to claim 6, wherein the heights of the inner plastic through columns and the outer plastic through columns are identical to the heights of the conductor pads.

8. The dual board patch array antenna according to claim 1, further comprising a signal switching pin and a radio frequency connection terminal, wherein the signal switching pin and the radio frequency connection terminal are provided on the other side of the radio board and adjacent to one of the feed sources, a first terminal of the signal switching pin is electrically connected to one of the feed sources, a second terminal of the signal switching pin is electrically connected to one of the probes, and a third terminal of the signal switching pin is electrically connected to the radio frequency connection terminal.

9. The dual board patch array antenna according to claim 8, further comprising an external dipole antenna, wherein the external dipole antenna is disposed on the other side of the radio board adjacent to one of the feed sources, and the external dipole antenna is electrically connected to the radio frequency connection terminal.

10. The dual board patch array antenna according to claim 1, wherein the isolation between the horizontally polarized antenna and the vertically polarized antenna is more than −30 dB in the frequency range of 4.5 GHZ to 6.4 GHZ, and the isolation in the frequency range of 5.15 GHz to 5.85 GHz is more than −40 dB.

* * * * *